Feb. 21, 1956 R. A. BRAYTON ET AL 2,735,450
LOCKING STRUCTURE FOR NESTABLE CULVERT PIPE
Filed Feb. 7, 1952 2 Sheets-Sheet 1

INVENTORS.
ROBERT A. BRAYTON,
WILLIAM CHARLES BOYLE
BY AND CHARLES HARRY CAMPBELL

Allen & Allen
ATTORNEYS.

Feb. 21, 1956 R. A. BRAYTON ET AL 2,735,450
LOCKING STRUCTURE FOR NESTABLE CULVERT PIPE
Filed Feb. 7, 1952 2 Sheets-Sheet 2
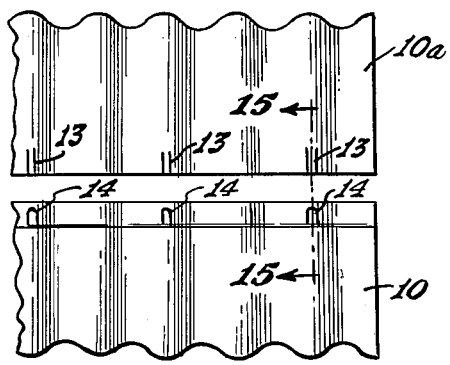
FIG.14.
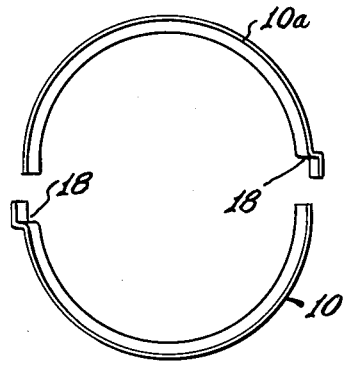
FIG.13.
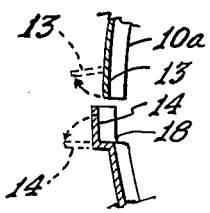
FIG.15.
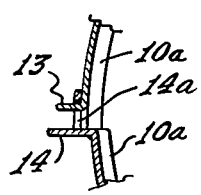
FIG.16.
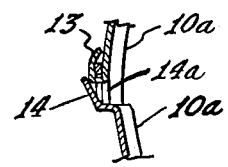
FIG.17.
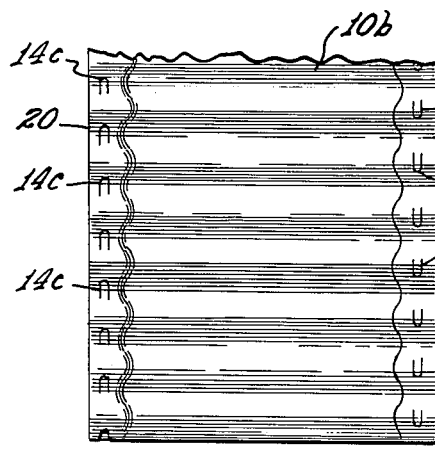
FIG.19.
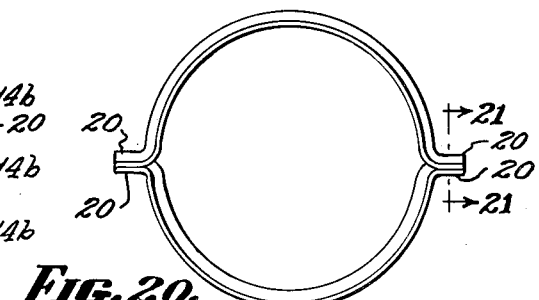
FIG.20.
FIG.21.
FIG.22.
FIG.23.
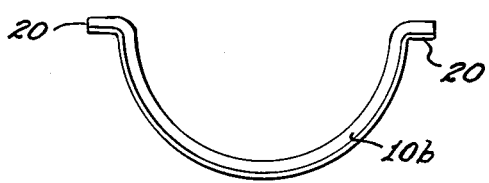
FIG.18.
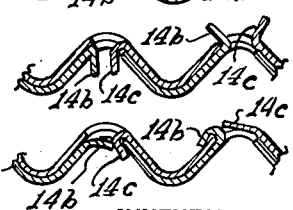
INVENTORS.
ROBERT A. BRAYTON,
WILLIAM CHARLES BOYLE
AND CHARLES HARRY CAMPBELL.
BY Allen & Allen
ATTORNEYS.

United States Patent Office

2,735,450
Patented Feb. 21, 1956

2,735,450
LOCKING STRUCTURE FOR NESTABLE CULVERT PIPE

Robert A. Brayton, William Charles Boyle, and Charles Harry Campbell, Middletown, Ohio, assignors to Armco Steel Corporation, Middletown, Ohio, a corporation of Ohio Application February 7, 1952, Serial No. 270,346

2 Claims. (Cl. 138—70)

This invention relates to nestable culvert pipe, and more particularly to a locking structure therefore. Culvert pipe is generally provided in semi-circular sections of a given length, and a pair of sections in mutually opposed and reversed relationship go to make up the full round pipe. A number of pairs of sections are laid end to end for the required length of the culvert. Various structures and measures have been provided in the past for securing the sections together, and these have generally involved bolts, stitches, hooks and eyes, and other separate fastening devices. Some of these fastening devices have been such as to require special tools, and skilled workmen in order to perform the operation of locking the sections of pipe together.

It is an object of the present invention to provide a locking structure which will be useful in connection with the various well-known types of nestable culvert pipe, and including specifically the off-set seat type, the flanged type, and the notched type of nestable culvert.

It is another object of the invention to provide a locking structure which can be incorporated into the individual sections during their fabrication, and which can be simply and easily locked in the field by unskilled workers without special tools or equipment of any kind.

It is another object of the invention to provide a locking structure which can be self-sufficient in that no additional parts, such as bolts, hooks or eyes, or stitches are required in order to lock the sections together.

It is an ancillary object of our invention to provide a structure whereby the seam between the pipe sections can be made water-tight where water-tightness is required.

These and additional objects of the invention, which will be described in more detail hereinafter, or which one skilled in the art will realize upon reading these specifications, we accomplish by that certain construction and arrangement of parts of which we shall now describe certain exemplary embodiments.

Reference is made to the drawings forming a part hereof, and in which:

Figure 13 is a view similar to Figure 6 but showing sections of the so-called off-set seat type;

Figure 14 is a fragmentary side elevational view as seen from the left of Figure 13;

Figure 15 is a fragmentary cross sectional view taken on a line 15—15 of Figure 14;

Figures 16 and 17 are views similar to Figure 15 showing stages in the locking procedure;

Figure 18 is an end elevation of a section of flanged type culvert pipe;

Figure 19 is a fragmentary plan view of the same;

Figure 20 is an end elevational view of two mutually opposed and reversed sections of flanged type pipe;

Figure 21 is a fragmentary cross sectional view taken on a line 21—21 of Figure 20; and Figures 22 and 23 are views similar to Figure 21 showing successive stages in the locking operation.

Briefly, in the practice of our invention we provide regardless of the type of pipe involved a series of spaced parallel pairs of cuts along one longitudinal edge to define a series of attached tabs. Along the other longitudinal edge of the same section we provide a series of substantially U-shaped cuts spaced from the edge of the section and disposed to define a series of oppositely directed attached tongues. When two like sections of pipe are mutually reversed and opposed, the tongues and tabs will be in alignment, and the tongues may be bent out to vacate a space through which the tabs are bent. The tongues may then be bent back to cover the space left by the bending out of the tongues initially.

Referring more particularly to the drawings and specifically to Figures 1–10 inclusive, we have shown the locking structure as applied to pipe of the so-called notched type. This particular type of pipe is clearly disclosed in the co-pending application of Boyle and Bursk, Serial No. 243,038, filed August 22, 1951. According to the disclosures of that application one edge of the section is left undisturbed, while the other edge is provided with a series of seating elements which are struck outwardly from the body of the section. Thus, in Figure 1 we have shown a substantially semi-circular section of corrugated metal and indicated generally at 10, which insofar as seating elements are concerned has the plain edge at 11, and the seating element along the other edge at 12. When two like sections of such pipe are reversed and mutually opposed, the plain edge of one section seats between the body of the edge of the other section and the struck out seat members 12.

Figure 3:
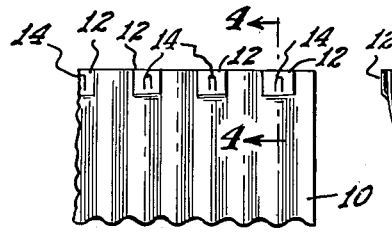
Figure 3 is a fragmentary side elevational view of the same as seen from the left of Figure 1.
Figure 1:
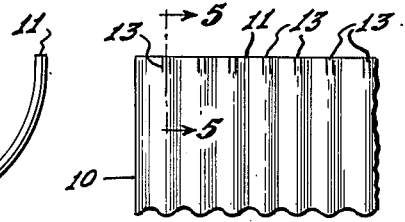
Figure 1 is an end elevational view of a section of corrugated pipe of the notched type.
Figure 2:
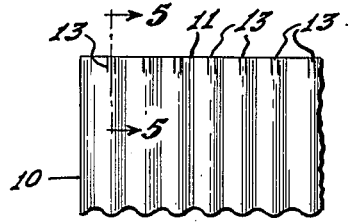
Figure 2 is a fragmentary side elevational view of the same as seen from the right of Figure 1.
Figure 4:
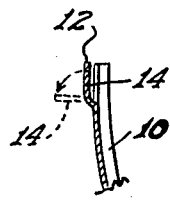
Figure 4 is a fragmentary cross sectional view taken on a line 4—4 of Figure 3.
Figure 6:
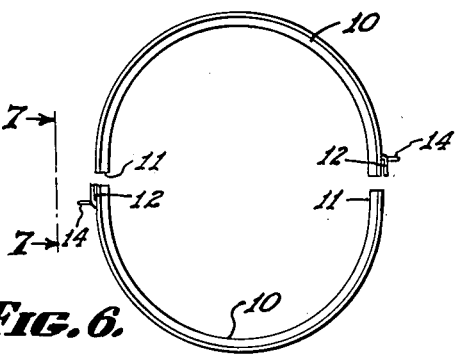
Figure 6 is an end elevational view of two like culvert sections in mutually opposed and reversed relation ready to be locked together.
Figure 5:
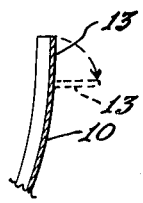
Figure 5 is a fragmentary cross sectional view taken on a line 5—5 of Figure 2.
Figure 7:
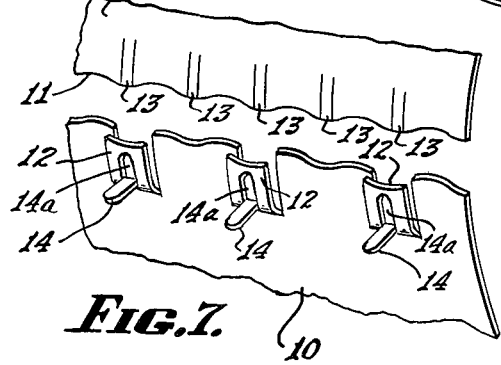
Figure 7 is a fragmentary perspective view taken on a line 7—7 of Figure 6.
Figure 8:
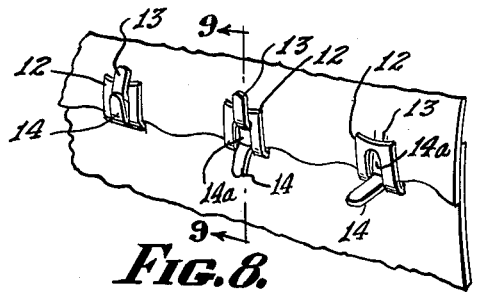
Figure 8 is a view similar to Figure 7 but showing various stages in the locking operation.

In Figure 8 the right hand locking elements are shown with simply the tongue 14 bent outwardly. In the central locking structure the tab 13 is shown as having been brought through the opening 14a, and being bent back against the body of the pipe. The left hand locking structure shows the final step which involves the bending of the tongue 14 back to cover the opening 14a.

Figure 9:
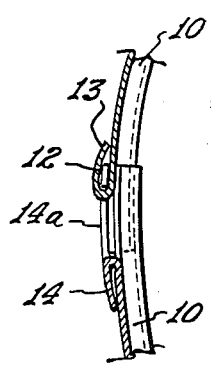
Figure 9 is a fragmentary cross sectional view taken on a line 9—9 of Figure 8.
Figures 11, 12:
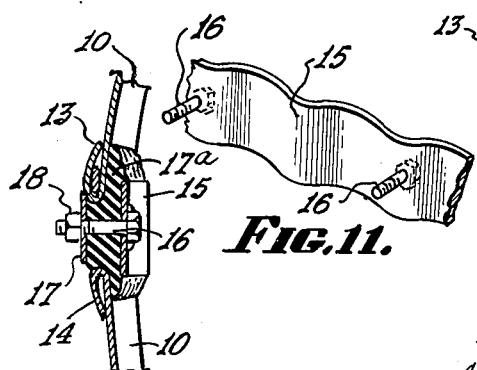
Figure 11 is a fragmentary perspective view of a cover strip which may be used where water-tight installation is required.
Figure 12 is a view similar to Figure 9 showing the use of the strip of Figure 11.
Figure 10:
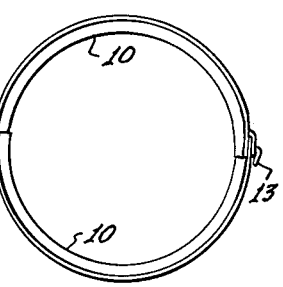
Figure 10 is an end elevational view showing two mutually opposed and reversed sections locked together.

It will be clear that this operation can be accomplished by the use only of a tool of the nature of a screw driver and a hammer so that the locking operation can be performed in the field without difficulty, and without the use of special tools of any kind.

Where it is desired to render the joint water-tight, we provide a cover strip or plate indicated generally at 15 in Figure 11, having the bolts 16 secured thereto as by welding or the like. If the pipe is corrugated the strip 15 will likewise be corrugated. Where the water-tight structure is desired, the tongues 14 are not bent upwardly as shown at the left of Figure 8, but are bent downwardly as shown in the central element of Figure 8 and as shown in Figure 9. The bolts 16 may then be passed through the spaces 14a and a washer 17 and nut 18 applied from the outside of the pipe. The space between the strip 15 and the pipe sections 10, as well as the interstices between the bolts 16 and the spaces 14 may then be filled with pitch as indicated at 17a. The result is a water-tight joint and the only additional tool required is a wrench to fit the nuts 18.

In Figures 14–17 inclusive, we have shown how the invention is applied to pipe of the off-set seat type. This is a well known type of pipe and differs from the notched type heretofore described in that instead of a series of seat members 12, the entire edge of the pipe is off-set as indicated at 18 in Figure 13. When two such like sections are mutually opposed and reversed, the plain edges seat in the off-set 18. Here again the tabs 13 and tongues 14 are provided as heretofore described and the operation of locking the sections together is exactly as described above. The sections in Figures 14–17 have been indicated at 10a.

In Figures 18–23 inclusive we have shown the same invention applied to the so-called flanged type of culvert pipe. The pipe sections are here indicated at 10b and they are provided with flanges 20 along both edges. In this particular embodiment the tabs and tongues are substantially alike in that both are U-shaped in general configuration. They are indicated at 14c and 14b respectively. They are disposed parallel to the edges of the sections instead of normal to the edges as in the other two embodiments. However, when the two sections are mutually reversed and opposed as in Figure 20, the locking procedure is the same. The tongues 14b are bent down to provide a space 14a as before, and the tabs 14c are bent down through the space 14a and clinched over as shown in Figure 23. The tongues 14b are then hammered down to fill the space 14a.

It will be clear that numerous modifications may be made without departing from the spirit of the invention, and we therefore do not intend to limit ourselves in any manner other than as set forth in the claims which follow.

Having now fully described our invention what we claim as new and desire to secure by Letters Patent is:

1. In a culvert pipe of the notched type composed of semicircular sections, wherein one edge of each section is notched at intervals to provide opposite seats for the unnotched edge of the other section; a locking structure comprising a substantially U-shaped cut in each notch, spaced from the edge thereof and disposed to define an outwardly directed attached tongue, a series of spaced parallel pairs of cuts in the unnotched edges of said sections, each pair of cuts defining an outwardly directed attached tab, said attached tabs and tongues being aligned and mutually opposed in the assembled condition of the pipe, with said tongues struck outwardly and said tabs bent outwardly through the spaces vacated by said tongues and bent back against the pipe.

2. In a circumferentially corrugated culvert pipe of the notched type composed of semicircular sections, wherein one edge of each section is notched at intervals on the crests of the corrugations to provide offset seats for the unnotched edge of the other section; a locking structure comprising a substantially U-shaped cut in each notch, spaced from the edge thereof and disposed to define an outwardly directed attached tongue, a series of spaced parallel pairs of cuts in the unnotched edges of said sections, each pair of cuts defining an outwardly directed attached tab, said attached tabs and tongues being aligned and mutually opposed in the assembled condition of the pipe, with said tongues struck outwardly and said tabs bent outwardly through the spaces vacated by said tongues and bent back against the pipe.

References Cited in the file of this patent

UNITED STATES PATENTS

| | | |
|---|---|---|
| 282,368 | Reilly | July 31, 1883 |
| 466,955 | Knapp | Jan. 12, 1892 |
| 597,056 | Dieckmann | Jan. 11, 1898 |
| 698,623 | Barclay | Apr. 29, 1902 |
| 841,736 | Stuber | Jan. 22, 1907 |
| 842,580 | Plecker | Jan. 29, 1907 |
| 955,153 | Graham | Apr. 19, 1910 |
| 970,772 | Wold | Sept. 20, 1910 |
| 1,025,327 | Standley | May 7, 1912 |
| 1,044,044 | Hardesty | Nov. 12, 1912 |
| 1,058,198 | Schlafly | Apr. 8, 1913 |
| 1,616,331 | Osborn | Feb. 1, 1927 |
| 1,771,167 | Dolan | July 22, 1930 |
| 2,540,141 | Shafer | Feb. 6, 1951 |